United States Patent [19]

Sidders

[11] Patent Number: 5,082,063
[45] Date of Patent: Jan. 21, 1992

[54] MIXING HEAD FOR SOIL TILLAGE

[75] Inventor: Derek Sidders, Prince Albert, Canada

[73] Assignee: Her Majesty the Queen in right of Canada as represented by the Minister of Forestry, Edmonton, Canada

[21] Appl. No.: 570,925

[22] Filed: Aug. 23, 1990

[51] Int. Cl.⁵ .......................... A01B 33/02; A01C 5/06
[52] U.S. Cl. ....................................... 172/57; 111/159; 172/124; 172/686; 172/701
[58] Field of Search ...................... 172/49, 57, 60, 118, 172/120, 123, 124, 556, 686, 697, 701; 37/94, 111, 189; 111/159, 158, 162

[56] References Cited

U.S. PATENT DOCUMENTS

| 3,510,970 | 5/1970 | Mikhailov et al. ...................... 37/94 |
| 4,301,605 | 11/1981 | Hofmeester .......................... 37/94 X |
| 4,535,555 | 8/1985 | Petraud ................................... 37/94 |

FOREIGN PATENT DOCUMENTS

| 13345 | 9/1956 | Fed. Rep. of Germany ........ 172/49 |
| 1205709 | 2/1960 | France ................................... 172/118 |
| 1429215 | 1/1966 | France ..................................... 172/49 |
| 314474 | 11/1971 | U.S.S.R. ................................. 172/701 |

Primary Examiner—Randolph A. Reese
Assistant Examiner—Jeffrey L. Thompson
Attorney, Agent, or Firm—Millen, White & Zelano

[57] ABSTRACT

The mixing head comprises a pair of opposed, spaced apart, generally vertical discs that are generally aligned with the direction of travel, although they are slightly angled so as to be wider apart at their front ends than at their rear ends. The discs are rotatably mounted to a free floating frame. Each disc has a plurality of radially extending, elongated, broad, rigid, chisel-like teeth which extend from the disc central portion out beyond its circumferential rim. The discs are driven to rotate against the direction of travel. When rotating, the disc and teeth formations operate to cut down into the coil and excavate it in portions carried by the teeth. The portions are moved inwardly by the angled formations and then thrown and dropped to the rear. The furrow formed has a flat-topped ridge overtopped with a loose mix of excavated soil and humus. The furrow is a good growing site for implanted seedlings.

1 Claim, 5 Drawing Sheets

MIXING HEAD FOR SOIL TILLAGE

FIELD OF THE INVENTION

The present invention relates to a tooth disc-type mixing head for tilling and mixing soil and surface debris, to provide a furrow useful for the growth of seedlings.

BACKGROUND OF THE INVENTION

The invention was developed in connection with a research project established to enhance forest renewal techniques.

The problem addressed was the need for a relatively high-speed mixer which could be pulled by a prime mover over the forest floor in an area that had undergone harvesting or fire.

The mixer had to be able to cope with residual "slash" or parts of trees, decomposing layers of tree parts ("duff"), and dense underground roots.

The objective was to create a furrow adapted to foster the growth of seedlings planted in it.

SUMMARY OF THE INVENTION

The invention involves a mixing head adapted for use with a tractor or other prime mover, comprising in combination:

a frame that has means, at its forward end, for establishing a pivot connection with the main frame of the pulling unit, whereby the frame may pivot about a generally horizontal axis and is preferably "free-floating";

a pair of laterally spaced apart, opposed, substantially vertical discs, said discs being rotatably mounted on the frame;

said frame carrying motor and gear means for rotating the discs simultaneously against the direction of travel;

each disc carrying a plurality of inwardly protruding elongated, broad, rigid, chisel-like teeth. More particularly, the teeth are preferably radially arranged, project inwardly perpendicularly from the disc face and extend radially outward from the central portion of the disc to beyond its circumferential rim;

the discs are preferably angled slightly so as to be wider apart at the front end than at the rear end; and the frame carries means, projecting laterally outwardly, for bearing against the undisturbed ground surface, to limit the extent of penetration of the free-floating disc and teeth formations into the soil.

In operation, the teeth enter the debris-laden soil and sweep through it in a forward direction to lift free a portion of excavated material. The successively excavated portions are moved inwardly by the angled formations of disc and teeth and are then thrown and dropped rearwardly, to collectively form an elongated mound of loose mixed soil and humus overtopping a flat-topped ridge of undisturbed soil. Simultaneously, parallel trenches are being formed, running along the two side edges of the mound-covered ridge.

The mound-covered ridge has been found to be effective as a growing site for implanted seedlings.

DESCRIPTION OF THE PREFERRED EMBODIMENT

Figure 1:
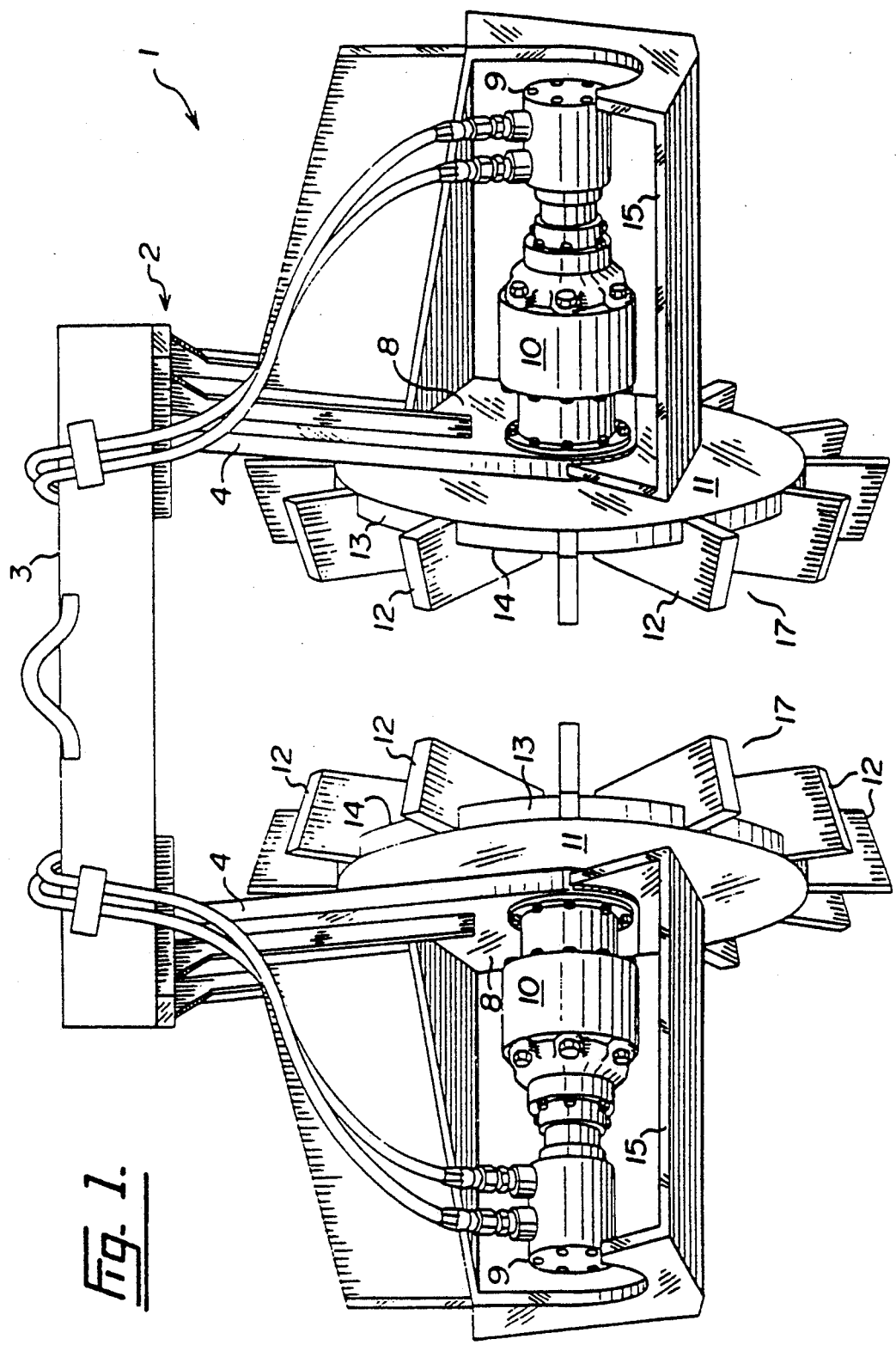
FIG. 1 is a rear view of the mixing head.
Figure 2:
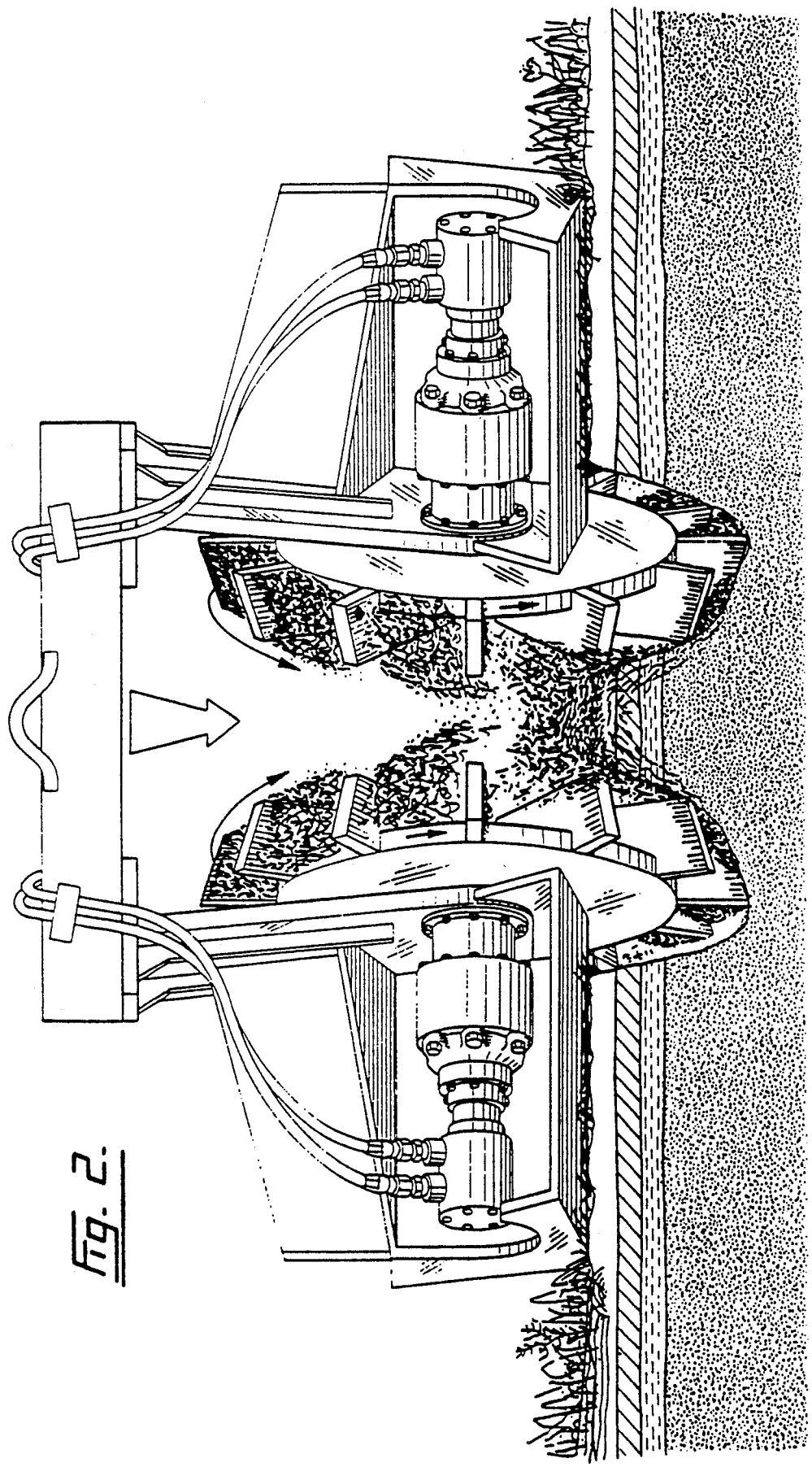
FIG. 2 is a view similar to FIG. 1, showing the mixing head in operation.
Figure 3:
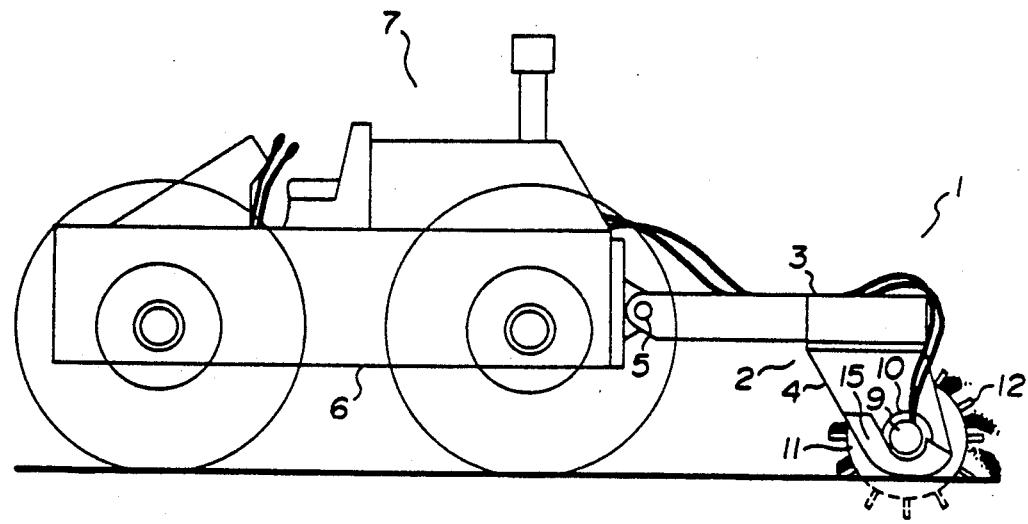
FIG. 3 is a simplified side view showing the mixing head mounted to a tractor.
Figure 4:
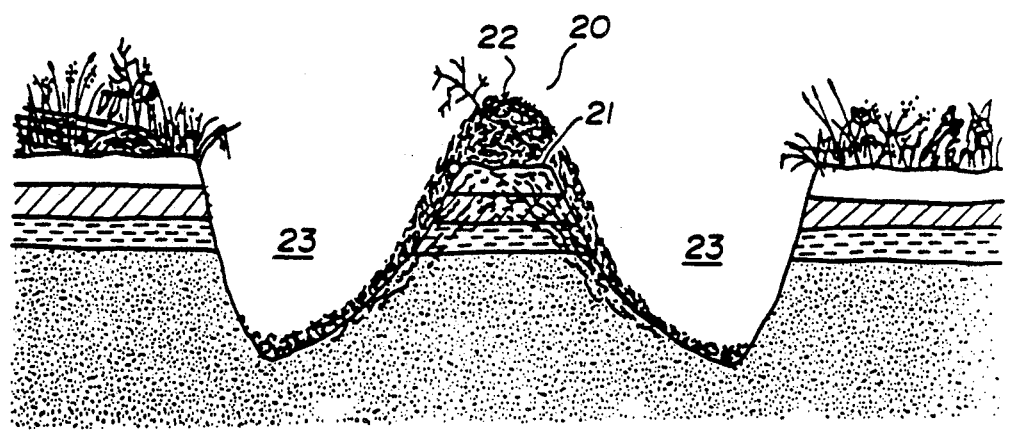
FIG. 4 is a fanciful cross-sectional profile of the composite furrow created by the head.
Figure 5:
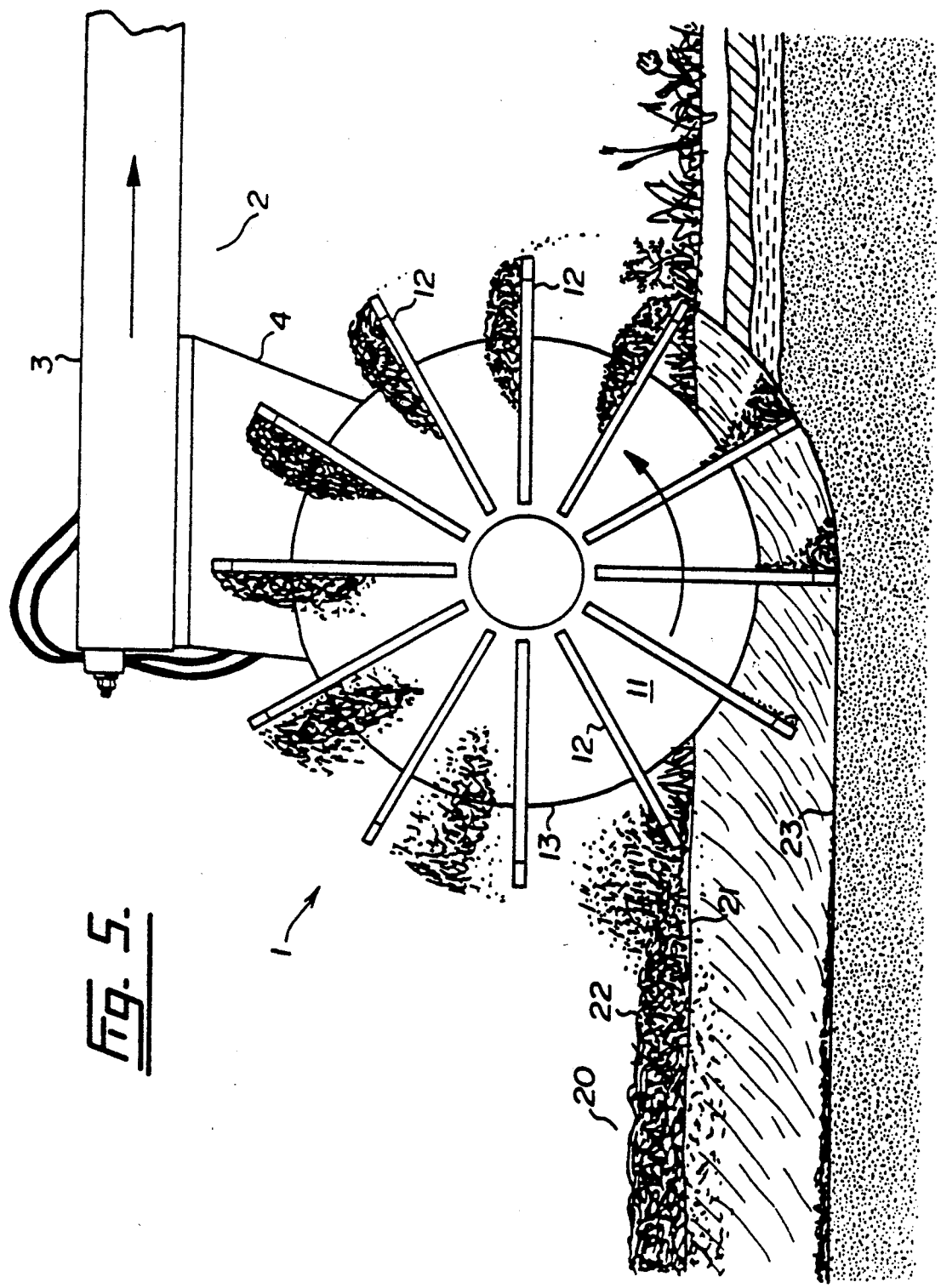
FIG. 5 is a side view showing one disc/teeth formation in operation.
Figure 6:
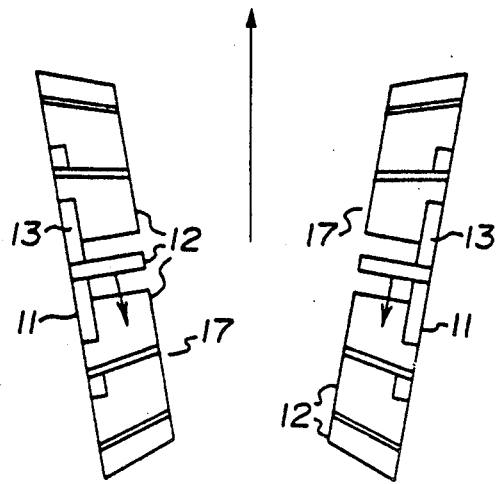
FIG. 6 is a simplified top plan view showing the discs prior to entering the soil.
Figure 7:
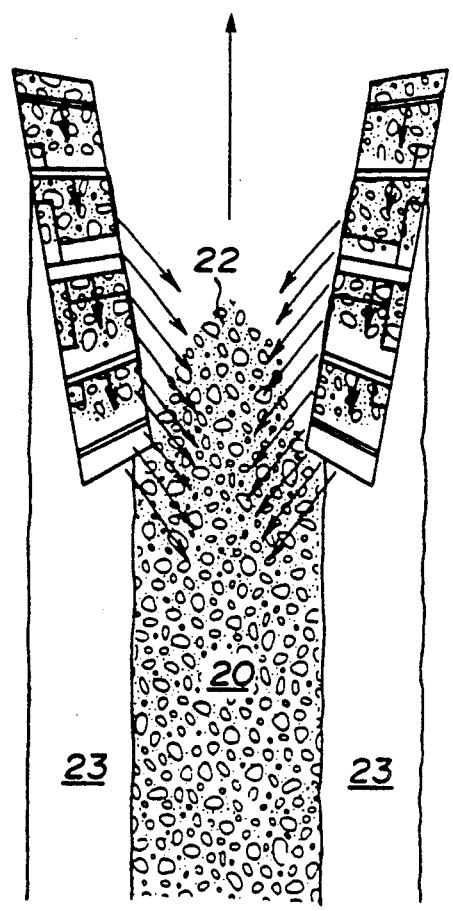
FIG. 7 is a view similar to that of FIG. 6, showing the discs working in the soil.

The mixing head 1 has a frame 2 comprising a horizontally extending box section 3 having a pair of downwardly extending, laterally spaced apart legs 4. The box section 3 is pivotally connected at its forward end by a horizontal pin 5 with the main frame 6 of a pulling unit 7, for pivoting about a generally horizontal axis.

Each leg 4 carries at its lower end, on its outside surface 8, a hydraulic motor 9 driving a planetary gear box 10. The output shaft (not shown) of the motor and gear assembly extends through the leg 4 and carries and drives a disc 11. Thus there is provided a discrete motor and gear means for rotating each disc 11.

The legs 4 are adjustably mounted with bolts to the box section 3 so that they can be swivelled slightly and locked in place to adjust the relative angularity of the two discs 11. The discs 11, although generally vertical, are positioned so as to be slightly (or acutely) angled, whereby they are further apart at their front edges than at their rear edges. The discs 11, although slightly angled, are generally aligned with the direction of travel.

Each disc 11 carries a plurality of radially extending teeth 12 which are broad, rigid and chisel-like in conjunction. The teeth 12 extend from the central portion of the disc 11 and protrude beyond its rim 13. The teeth 12 project inwardly and perpendicularly from its inside surface 14. Each disc 11 and its teeth 12 combine to form a separately driven cutting formation or assembly.

A concave housing 15 extends laterally and outwardly from the outside surface 8 of each leg 4. The housing 15 extends close to the bottom portion of the disc rim 13. The housing 15 acts as a gage, by bearing against the undisturbed soil and limiting the depth of penetration of the disc and teeth formations 17.

The frame 2, disc and teeth formations 17, and housings 15 are all formed of thick steel to create a heavy and rugged assembly that can penetrate and till the log-strewn forest soil.

The method of operation of the assembly has already been described. The disc and teeth formations 17 function to form a furrow 20 comprising a flat-topped ridge 21 of undisturbed soil overlain by a mound 22 of loose soil and humus. Two trenches 23 run along the sides of the ridge 21.

The scope of the invention is set forth by the following claims.

The embodiments of the invention in which an exclusive property or privilege is claimed are defined as follows:

1. A mixing head for tilling behind a pulling unit, comprising:
    a frame adapted to be pivotally connected at its forward end to the pulling unit, for pivoting about a substantially horizontal axis;
    a pair of laterally spaced apart, substantially vertical, opposed discs rotatably mounted on the frame, said discs being acutely angled, whereby they are further apart at their forward ends than at their rear ends, said discs being generally aligned with the direction of travel;

each disc carrying a plurality of broad, rigid, elongated, chisel-like teeth, projecting substantially perpendicularly and inwardly from the inner face of the disc, said teeth extending generally radially from the central portion of the disc and projecting beyond the disc rim, each disc and its teeth forming a formation;

said formations being laterally spaced apart;

motor and gear means, carried by the frame, for rotating each disc in a direction against the direction of travel; and means, carried by the frame, for bearing against the undisturbed soil to the sides of the mixing head and limiting the depth of penetration of the disc and teeth formations.

\* \* \* \* \*